US012501222B2

(12) United States Patent
Monsen et al.

(10) Patent No.: US 12,501,222 B2
(45) Date of Patent: Dec. 16, 2025

(54) TELECOIL PREDICTED REPEATING SYSTEM INTERFERENCE CANCELLER

(71) Applicant: Starkey Laboratories, Inc., Eden Prairie, MN (US)

(72) Inventors: Thomas O. Monsen, Carver, MN (US); Justin R. Burwinkel, Eden Prairie, MN (US); Mohammad Reza Movahedi, Minnetonka, MN (US); Kenneth Kragh Jensen, Shakopee, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 382 days.

(21) Appl. No.: 18/354,856

(22) Filed: Jul. 19, 2023

(65) Prior Publication Data

US 2025/0030990 A1 Jan. 23, 2025

(51) Int. Cl.
*H04R 25/00* (2006.01)

(52) U.S. Cl.
CPC .......... *H04R 25/453* (2013.01); *H04R 25/43* (2013.01); *H04R 25/554* (2013.01)

(58) Field of Classification Search
CPC .... H04R 25/453; H04R 25/43; H04R 25/554; H04R 25/505; H04R 2225/49
See application file for complete search history.

(56) References Cited

U.S. PATENT DOCUMENTS 10,475,467 B2 * 11/2019 Levitt .................. G10L 21/013

OTHER PUBLICATIONS

Husung et al. "Hearing Instrument" (Year: 2020).*

* cited by examiner

*Primary Examiner* — Brian Ensey
(74) *Attorney, Agent, or Firm* — Schwegman Lundberg & Woessner, P.A.

(57) ABSTRACT

Disclosed herein, among other things, are systems and methods for cancelling interference from a telecoil signal for ear-wearable devices. A method includes receiving a signal from a telecoil of a hearing device, and using a trigger signal to initiate recordings of segments of the telecoil signal. An interference component is isolated from the telecoil signal using the recorded segments. The interference component is inverted and added to the telecoil signal to cancel the interference component from the telecoil signal, and audio from the telecoil signal is provided to a wearer of the hearing device.

20 Claims, 4 Drawing Sheets

TELECOIL PREDICTED REPEATING SYSTEM INTERFERENCE CANCELLER

TECHNICAL FIELD

This document relates generally to audio device systems and more particularly to systems and methods for cancelling or removing interference or artifacts from a telecoil signal for ear-wearable devices.

BACKGROUND

Audio devices can be used to provide audible output to a user based on received wireless signals. Examples of audio devices include speakers and ear-wearable devices, also referred to herein as hearing devices. Example of hearing devices include hearing assistance devices or hearing instruments, including both prescriptive devices and non-prescriptive devices. Specific examples of hearing devices include, but are not limited to, hearing aids, headphones, and earbuds.

Hearing aids are used to assist patients suffering hearing loss by transmitting amplified sounds to ear canals. In one example, a hearing aid is worn in and/or around a patient's ear. Hearing aids may include processors and electronics that improve the listening experience for a specific wearer or in a specific acoustic environment.

Telecoils or other magnetic sensors may be used to access wireless, non-acoustic audio transmissions from, e.g., inductive hearing loops, neck loops, etc., which ultimately provides hearing aid users access to speech with a greater signal to noise ratio (SNR). Telecoils are sensitive to magnetic fields and may sense signals that are potentially detrimental to sound quality, including internal interference caused by other hearing aid components like Bluetooth radios, power management integrated circuits (PMIC), receivers and associated wiring. The presence of these interfering signals makes designing the internal layout of hearing aids a cumbersome process, particularly for custom hearing aid styles where the internal components have additional degrees of freedom while being constructed.

Thus, there is a need in the art for improved systems and methods for cancelling or removing interference or artifacts from a telecoil signal for ear-wearable devices.

SUMMARY

Disclosed herein, among other things, are systems and methods for cancelling interference from a telecoil signal for ear-wearable devices. A method includes receiving a signal from a telecoil of a hearing device, and using a trigger signal to initiate recordings of segments of the telecoil signal. An interference component is isolated from the telecoil signal using the recorded segments. The interference component is inverted and added to the telecoil signal to cancel the interference component from the telecoil signal, and audio from the telecoil signal is provided to a wearer of the hearing device Various aspects include a hearing device configured to cancel interference from a magnetic sensor signal. The hearing device includes a magnetic sensor configured to receive an inductive input, and at least one processor and data storage in communication with the at least one processor. The data storage comprises instructions thereon that, when executed by the at least one processor, causes the at least one processor to receive a signal from the magnetic sensor, and use a trigger signal to initiate recordings of segments of the signal. An interference component is isolated from the signal using the recorded segments. The interference component is inverted and added to the signal to cancel the interference component from the signal, and audio from the signal is played for a wearer of the hearing device.

This Summary is an overview of some of the teachings of the present application and not intended to be an exclusive or exhaustive treatment of the present subject matter. Further details about the present subject matter are found in the detailed description and appended claims.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1A:
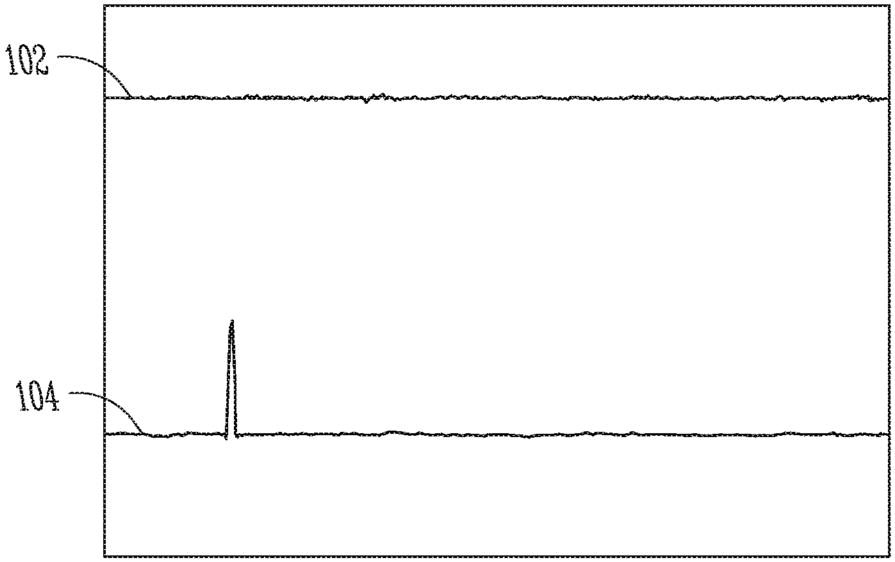
FIG. 1A illustrates a graphical diagram of a waveform of a trigger signal and corresponding telecoil signal for an ear-wearable device, according to various examples of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment, including combinations of such embodiments. The following detailed description is demonstrative and not to be taken in a limiting sense. The scope of the present subject matter is defined by the appended claims, along with the full scope of legal equivalents to which such claims are entitled.

The present detailed description will discuss audio devices such as hearing devices and speakers. The description refers to hearing devices generally, which include earbuds, headsets, headphones and hearing assistance devices using the example of hearing aids. Other hearing devices include, but are not limited to, those in this document. It is understood that their use in the description is intended to demonstrate the present subject matter, but not in a limited or exclusive or exhaustive sense.

Telecoils or other magnetic sensors may be used to access wireless, non-acoustic audio transmissions which ultimately provides hearing aid users access to speech with a greater signal to noise ratio (SNR). Telecoils are sensitive to magnetic fields and may sense signals that are potentially detrimental to sound quality, including internal interference caused by other hearing aid components like Bluetooth radios, power management integrated circuits (PMIC), batteries, receivers and associated wiring. The presence of these interfering signals makes designing the internal layout of hearing aids a cumbersome process, particularly for custom hearing aid styles where the internal components have additional degrees of freedom while being constructed.

Telecoil artifacts are caused by components on the hearing device circuit, such as a Bluetooth radio, which draw short bursts of current. Most hearing device circuits cannot feasibly route the power and ground current paths for every component to be exactly overlaid at all points, especially around the battery contacts. Therefore, the typical hearing device circuit will have current loops where current through components takes a somewhat circular rather than linear path as it comes from and returns to the battery. These current loops cause a magnetic field to be created. When the current rapidly changes, it causes a rapidly changing magnetic field. This changing magnetic field is what the telecoil picks up as the "tick" or ticking artifact. Telecoils are known to have directional sensitivity and are generally positioned in either a horizontal-to-the-earth's surface position to be optimally sensitive to magnetic fields produced by telephone receivers placed near the wearer's ear and/or hearing device, or in a vertical-to-the-earth's surface position to be optimally sensitive magnetic fields produced by assistive hearing accessibility systems like induction hearing loops and neck loops. With progressively more hearing aids connecting to mobile phones using Bluetooth, there has been greater emphasis for selecting vertical orientations for the telecoil that yield optimal performance with assistive hearing accessibility systems. Hearing devices have size limitations that may make it difficult or impossible to find a tick-free telecoil location that allows the telecoil orientation to be optimized for the desired functional emphasis.

The present subject matter provides for a hearing device to remove ticking artifacts from a telecoil signal when the source of the ticking is an internal hearing device operation, such as Bluetooth radio activity. In various examples, the present subject matter uses an internal trigger signal to time brief audio recordings of the telecoil signal, which are then added to a running average to separate the tick component from random noise. This tick component or signature can then be inverted and summed with the telecoil signal during subsequent tick events, with time alignment based on the previously mentioned trigger signal, such that the tick artifact can be effectively cancelled and removed from the telecoil signal without altering the desired content of the telecoil signal, in various examples. The present subject matter may be implemented to dramatically reduce design and build times around telecoil use for hearing devices, and allow much more freedom in housing custom hearing devices with telecoils.

In various examples, the present subject matter provides a method for removing internal interference artifacts for magnetic sensors in hearing devices. To remove the internal interference artifacts, this method may assume that the artifact timing can be predicted in advance of happening, and that the artifact is virtually identical each time it occurs. For example, to cancel a ticking artifact caused by a wireless communication circuit or radio, the present method derives a clean/isolated reference version or signature of the interference tick without any significant content from other sources. To derive the clean reference version, the method uses a trigger signal from the radio or other circuit entity that causes the artifact. This trigger signal reliably occurs exactly the same amount of time before the artifact will happen, in various examples. With this trigger signal, the present method can time the start point of very brief audio recordings of the telecoil signal clips. These clips will contain the tick artifact, and some amount of random noise or louder speech or music, in various examples. At this stage, clips that contain primarily desired content (speech or music) are rejected, either by using an energy level threshold, or by some other means to avoid contaminating the cancellation signal, in various examples. The remaining clips are fed to a continuously-updating running average, which has the effect of reducing or averaging out random noise, leaving only the tick signature, in various examples. The present subject matter may then invert the tick signature and replay the inverted tick signature whenever the trigger signal occurs, in the future, to effectively cancel out the ticking artifact in the telecoil signal, in various examples.

Figure 1B:
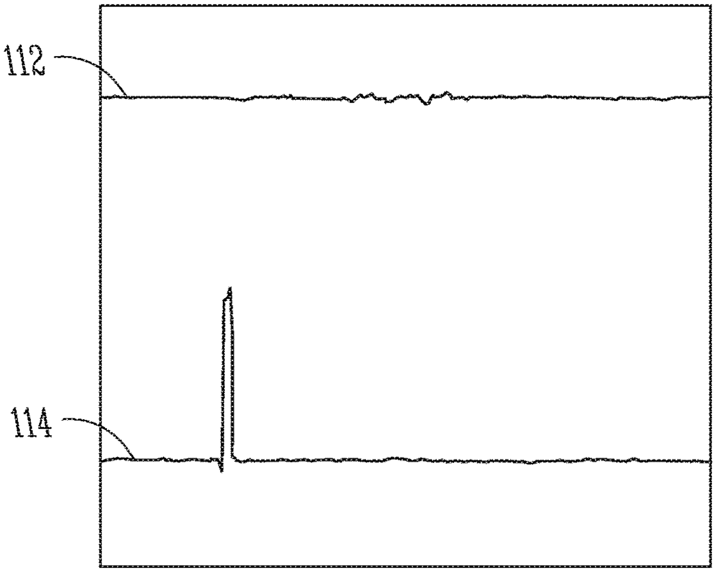
FIG. 1B illustrates a graphical diagram of a waveform of averaged samples of a corresponding telecoil signal for an ear-wearable device, according to various examples of the present subject matter.

FIG. 1A illustrates a graphical diagram of a waveform of a trigger signal 104 and corresponding telecoil signal 102 for an ear-wearable device, according to various examples of the present subject matter. In the depicted embodiment, the telecoil signal 102 includes a 11.5 dB audible tick. The present method may identify and acquire a "tick signature" by averaging samples of the telecoil signal. FIG. 1B illustrates a graphical diagram of a cleaned up version of the waveform created by averaging twenty samples of the telecoil signal 112 using a trigger signal 114 for the ear-wearable device, according to various examples of the present subject matter. Note that the random noise in the telecoil signal 112 has been reduced, leaving a much clearer tick signature. In the depicted example, the tick was recorded at the aid output and was caused by a Bluetooth wireless radio circuit waking up, broadcasting advertising packets, and then shutting down again. The trigger signal 114 is provided from a spectrum analyzer set up to trigger when it detects Bluetooth energy. In other examples, the trigger signal is internal to the hearing device.

The above-described method works well as long as the ticks that occur are all very similar. However, in real-world applications, there may be many different types of ticks as the radio circuit performs different functions, such as advertising, sending data, waking up to receive data, etc. To account for the potentially different waveforms these functions may produce, the present subject matter may classify the recorded ticks and add them to different running averages such that multiple unique signatures can be collected and deployed as needed to cancel the different ticks that occur. In various examples, the present method uses trigger signals that not only indicate the timing of an impending tick, but also its type, source, duration, or output power.

According to various examples, the present subject matter provides for identification of tick sequences using samples derived from classification and averaging, as described above. Due to the time, order, and variety of these tick sequences, it would not be possible for a human using ordinary mental processes to effectively choose which samples to use or to properly identify the tick sequences.

In various examples, the present method may be used to remove ticking artifacts in any situation in which the tick sequence can be identified and predicted. In one example, the present subject matter may be used to remove ticking artifacts when the hearing device is in microphone mode. In this example, when a hearing device remains powered on with a low battery voltage (such as when the battery voltage dips lower than 1 Volt), ticking artifacts may be present when the device is in microphone mode, which is caused by the current to the radio circuit that adds noise to the various power rails of the circuit, which is then picked up at either the microphone preamplifier or digital signal processor (DSP) as a ticking artifact. The present method then identifies and removes the ticking artifact. Other types of ticking artifacts may be identified and removed without departing from the scope of the present subject matter.

In various examples, the present method may use signature refresh rates for a particular device. Because the physical relationship of the telecoil to the wireless communication circuit does not change during use, the tick interference picked up by the telecoil changes very slowly or not at all over time in a given device. Thus, the cancellation tick signature may produce effective tick cancellation for a significant amount of time even without updates to the tick running average. In various examples, reducing the signature refresh rate may save energy and processing power in the device. If the tick interference is very consistent over time, the present method is effective using a one-time tick signature acquisition done at a calibration phase of hearing device production or at hearing device startup. However, in some examples tick signature acquisition will need to be refreshed as the battery changes voltage over its charge cycle, possibly every hour or so in an example. In some embodiments, the tick signature acquisition rate will increase as the battery voltage drop rate changes over its charge cycle, and further embodiments may include for the prediction of voltage drop rate at one or more future times based on historical voltage drops observed from previous charge and/or discharge cycles. The present method may also be used to cancel ticks caused by other devices that the hearing device can receive a trigger signal from, in some examples.

Previous solutions to reduce ticking for magnetic sensors such as telecoils have been employed, but each has significant limitations. For example, some previous concealment methods detected when a tick occurs, and replay the previous few milliseconds of the telecoil signal instead of the ticking section of audio. However, while this audio replay eliminates the tick, it often creates a significant acoustic artifact if there is a desired signal occurring and not just random background noise and/or may diminish the audibility of sounds of listening interest, e.g., speech phones, musical notes, and the like. This issue becomes worse as ticking frequency increases, and thus this previous method had to be abandoned in practice with the adoption of certain 2.4 GHz audio streaming protocols, e.g., Android Streaming For Hearing Aids (ASHA), Apple's Low Energy Audio (LEA), and Bluetooth Auracast, due to this issue. In another example, some previous methods adjusted wireless communication circuit layout and telecoil position to minimize the tick magnetic field that the telecoil picks up. However, determining effective layout changes for a hearing device is difficult to do with device space constraints, and often requires significant durations of engineering and technician trial-and-error. Even at that, it is often impossible to completely eliminate the tick using this method. In yet another example, some previous methods raised the circuit noise floor to mask the ticking component. However, while increasing the noise floor is simple and effective for barely audible ticks, but it also increases telecoil equivalent input noise (EIN), thus reducing sound quality and audibility of low-level sounds that would be of interest for the wearer of the hearing device, such as soft, voiceless, fricative speech sounds /f,θ,s,ʃ,h/.

The present subject matter actively cancels instead of masks the tick artifact, which preserves the desired signal in its entirety. The present subject matter is unique in that it requires no special physical layout considerations, and does not degrade the telecoil signal content. The present subject matter also is inherently adaptive to different designs and can effectively learn to cancel ticks in any new hearing device product or unique casing of a custom hearing device without the need for further engineering or design effort beyond the establishment of an appropriate trigger signal. The present subject matter may also help enhance the robustness of hearing devices, since shifts in component placement (such as from dropping the device) will not re-introduce or worsen the cancelled artifacts, since the present subject matter may regularly refresh tick signatures. In addition, the present subject matter provides the ability to incorporate telecoil technology into a greater number of hearing device styles, including micro receiver-in-canal devices (RICs) and smaller custom hearing devices. Further benefits of the present subject matter include reducing design effort, time and cost around telecoils, reducing custom hearing device casing time, reducing the frequency of warranty claims for telecoil tick complaints, and providing better sound quality and lower ELN during telecoil use.

Figure 2:
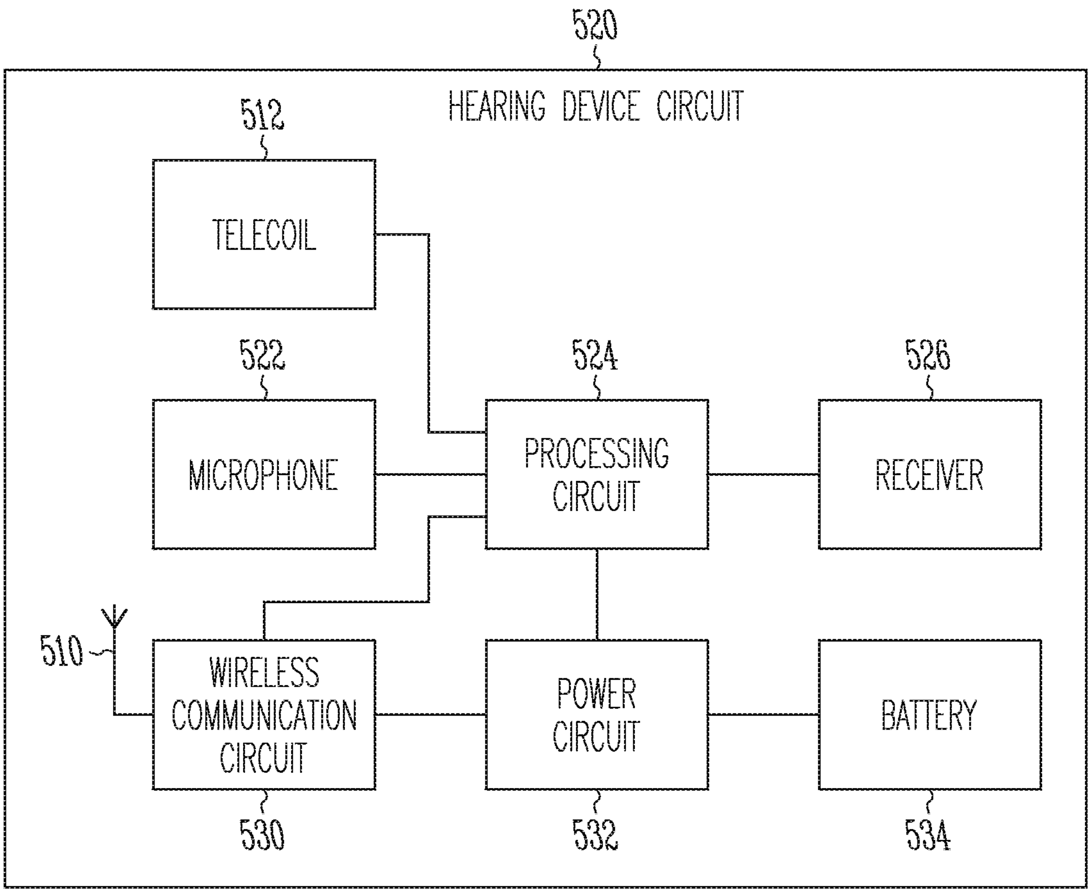
FIG. 2 illustrates a block diagram of a hearing device circuit, according to various examples of the present subject matter.

FIG. 2 illustrates a block diagram of a hearing device circuit, according to various examples of the present subject matter. Hearing device circuit 520 represents an example of portions of a hearing device and includes a microphone 522, a wireless communication circuit 530, an antenna 510, a telecoil 512, a processing circuit 524, a receiver (speaker) 526, a battery 534, and a power circuit 532. Microphone 522 receives sounds from the environment of the hearing device user (wearer of the hearing device). Wireless communication circuit 530 communicates with another device wirelessly using antenna 510, including receiving programming codes, streamed audio signals, and/or other audio signals and transmitting programming codes, audio signals, and/or other signals. Examples of the other device includes other hearing devices of other users, another hearing device of a pair of hearing devices for the same wearer, a hearing device host device, an assistive listening device (ALD), an audio streaming device, a smartphone, and other devices capable of communicating with hearing devices wirelessly. Processing circuit 524 controls the operation of hearing device using the programming codes and processes the sounds received by microphone 522 and/or the audio signals received by wireless communication circuit 530 and telecoil 512 to produce output sounds. Receiver 526 transmits output sounds to an ear canal of the hearing device wearer. Battery 534 and power circuit 532 constitute the power source for the operation of hearing device circuit 520. In one example, power circuit 532 can include a power management circuit. In another alternative or additional example, battery 534 can include a rechargeable battery, and power circuit 532 can include a recharging circuit for recharging the rechargeable battery.

In various examples, the hearing device is configured to cancel interference from a magnetic sensor signal. The hearing device circuit 520 includes a magnetic sensor, such as a telecoil 512, configured to receive an inductive input, and at least one processor or processing circuit 524 and data storage in communication with the processing circuit 524. The data storage comprises instructions thereon that, when executed by the processing circuit 524, causes the processing circuit 524 to receive a signal from the magnetic sensor or telecoil 512, and use a trigger signal to initiate recordings of segments of the signal. An interference component, such as spikes in current from the power circuit 532 or battery 534 during use of wireless communication circuit 530, is isolated from the signal using the recorded segments. The interference component is inverted and added to the signal to cancel the interference component from the signal, and audio from the signal is played for a wearer of the hearing device using the receiver 526, in various examples.

In various examples, to isolate an interference component, the processing circuit 524 is programmed to add the recorded segments to a running average of recorded segments. In some examples, to sum the inverted interference component with the segments, the processing circuit 524 is programmed to use time alignment based on the trigger signal. The interference component includes an artifact from a wireless radio or wireless communication circuit 530 of the hearing device, in some examples. The magnetic sensor may include a telecoil or other magnetic receiving device, in various examples. The processing circuit 524 may be programmed to examine the recordings of segments of the signal, identify one or more recordings that contain primarily desired audio content, and exclude the identified one or more recordings when isolating the interference component. In some examples, to identify the one or more recordings that contain primarily desired audio content, the processing circuit 524 is programmed to compare the recordings to an energy level threshold. The trigger signal may be configured to identify timing and/or a type of an impending interference component, in various examples. The hearing device circuit 524 may be included in an ear bud, headphones, a hearing aid, or other ear-wearable device, in various examples.

In still other examples, the hearing device may communicate with a body worn device such as on a neck loop with a Bluetooth radio and such a body worn device may include a telecoil transmitter to convey the audio to a person wearing a hearing aid or hearing aids equipped with a telecoil 512. Various types of wireless connections may be used, including but not limited to Bluetooth® (such as Bluetooth® 5.2, or Auracast, for example) or Bluetooth® Low Energy (BLE) connections, infrared, frequency modulation (FM) radio, digital modulation (DM) radio, and the like.

In various examples, at least one of the hearing devices includes a connection to a smartphone application. The smartphone application is configured to be used to control the hearing devices, in some examples. In some examples, at least one of the hearing devices includes a voice control configured to be used to control the hearing devices. In various examples, at least one of the hearing devices is a hearing assistance device, such as a hearing aid.

Figure 3:
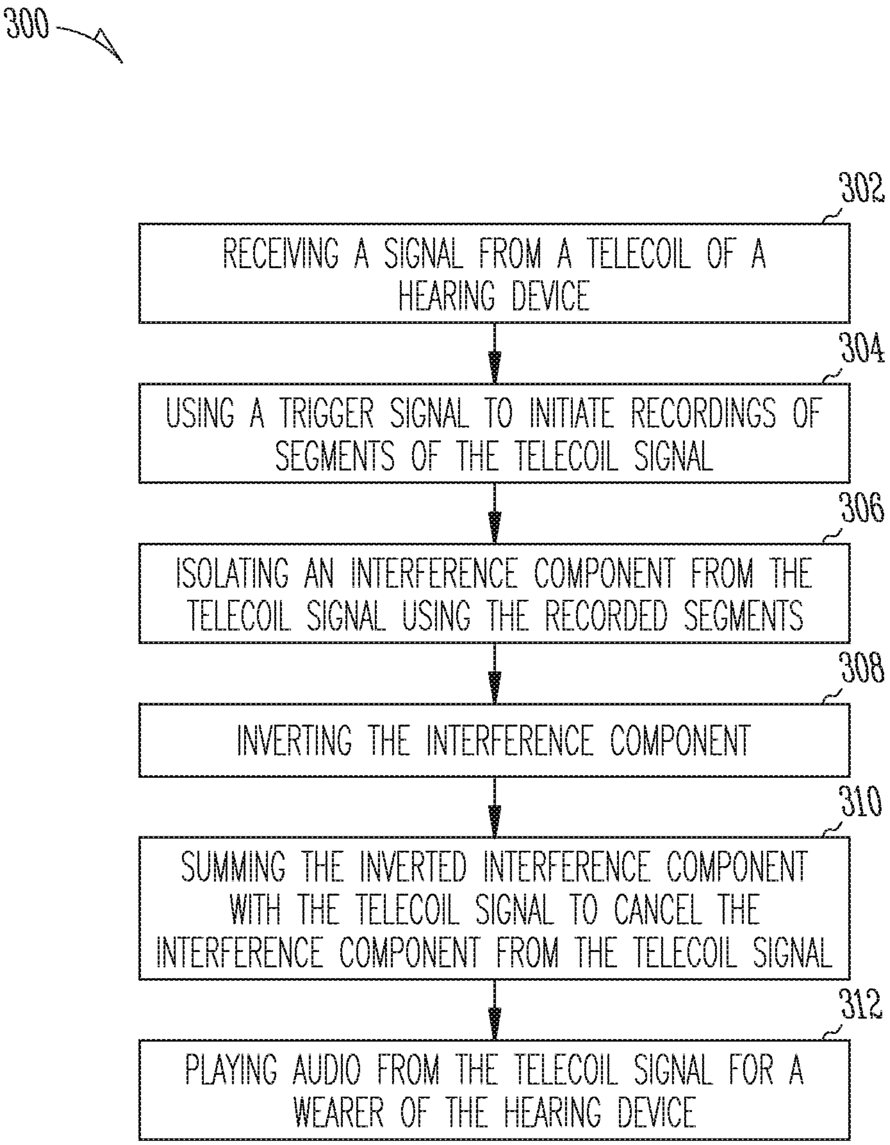
FIG. 3 illustrates a flow diagram of a method for cancelling interference from a telecoil signal for ear-wearable devices, according to various examples of the present subject matter.

FIG. 3 illustrates a flow diagram of a method for cancelling interference from a telecoil signal for ear-wearable devices, according to various examples of the present subject matter. The method 300 includes receiving a signal from a telecoil of a hearing device, at step 302. At step 304, a trigger signal is used to initiate recordings of segments of the telecoil signal. An interference component is isolated from the telecoil signal using the recorded segments, at step 306, and the interference component is inverted at step 308. At step 310, the inverted interference component is summed with the telecoil signal to cancel the interference component from the telecoil signal. Audio from the telecoil signal is played for a wearer of the hearing device, at step 312.

In various examples, isolating an interference component includes adding the recorded segments to a running average of recorded segments. Summing the inverted interference component with the telecoil segment includes using time alignment based on the trigger signal, in various examples. The interference component includes an artifact from a wireless radio of the hearing device, in some examples. In various examples, the wireless radio includes a Bluetooth® compatible radio. Additionally or alternatively, the method includes examining the recordings of segments of the telecoil signal, identifying one or more recordings that contain primarily desired audio content, and excluding the identified one or more recordings when isolating the interference component. Identifying the one or more recordings that contain primarily desired audio content includes comparing the recordings to an energy level threshold, in various examples. The trigger signal is configured to identify timing of an impending interference component, in one example. In some examples, the trigger signal is additionally or alternatively configured to identify a type of an impending interference component. The hearing device may include an ear bud, headphones, a hearing aid, or other ear-wearable device, in various examples.

Figure 4:
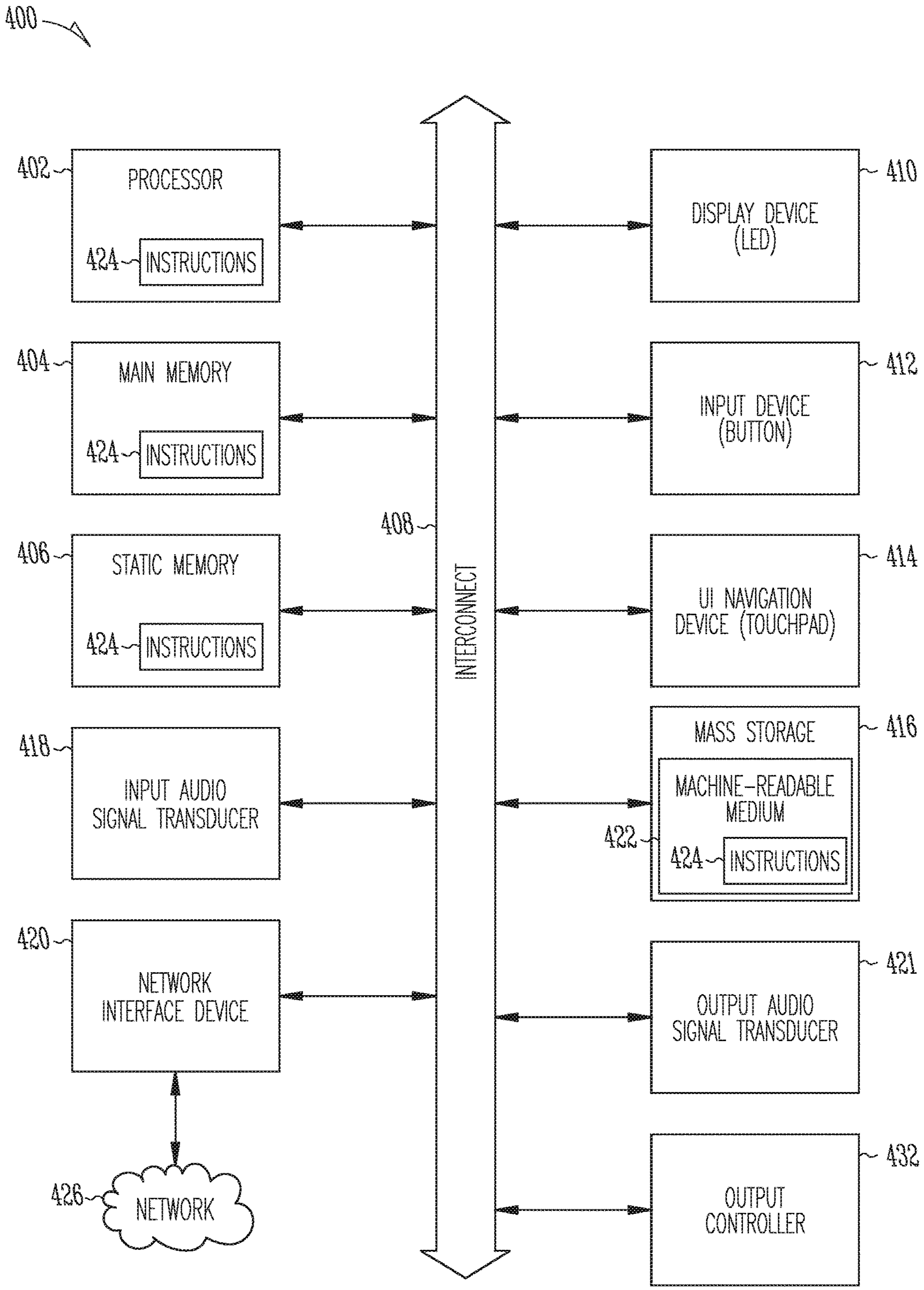
FIG. 4 illustrates a block diagram of an example machine upon which any one or more of the techniques discussed herein may perform.

FIG. 4 illustrates a block diagram of an example machine 400 upon which any one or more of the techniques (e.g., methodologies) discussed herein may perform. In alternative examples, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a hearing device, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, one or more input audio signal transducers 418 (e.g., microphone), a network interface device 420, and one or more output audio signal transducer 421 (e.g., speaker). The machine 400 may include an output controller 432, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: nonvolatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400, and includes digital or analog communications signals or other intangible medium to facilitate communication of such software.

Various examples of the present subject matter support wireless communications with a hearing device. In various examples the wireless communications may include standard or nonstandard communications. Some examples of standard wireless communications include link protocols including, but not limited to, Bluetooth™, Bluetooth™ Low Energy (BLE), Auracast, IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications while others support NFMI. Although the present system is demonstrated as a radio system, it is possible that other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various examples, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various examples, the battery is rechargeable. In various examples multiple energy sources are employed. It is understood that in various examples the microphone is optional. It is understood that in various examples the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various examples of the present subject matter the processor is adapted to perform instructions stored in one or more memories, which may or may not be explicitly shown. Various types of memory may be used, including volatile and nonvolatile forms of memory. In various examples, the processor or other processing devices execute instructions to perform a number of signal processing tasks. Such examples may include analog components in communication with the processor to perform signal processing tasks, such as sound reception by a microphone, or playing of sound using a receiver (i.e., in applications where such transducers are used). In various examples of the present subject matter, different realizations of the block diagrams, circuits, and processes set forth herein may be created by one of skill in the art without departing from the scope of the present subject matter.

It is further understood that different hearing devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing devices, including hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in bone conduction hearing devices, in some examples. The present subject matter may be used in devices whether such devices are standard or custom fit and whether they provide an open or an occlusive design. It is understood that other hearing devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:
receiving a signal from a telecoil of a hearing device;
using a trigger signal to initiate recordings of segments of the telecoil signal;
isolating an interference component from the telecoil signal using the recorded segments;
inverting the interference component;
summing the inverted interference component with the telecoil signal to cancel the interference component from the telecoil signal; and
playing audio from the telecoil signal for a wearer of the hearing device.

2. The method of claim 1, wherein isolating an interference component includes adding the recorded segments to a running average of recorded segments.

3. The method of claim 1, wherein summing the inverted interference component with the telecoil segment includes using time alignment based on the trigger signal.

4. The method of claim 1, wherein the interference component includes an artifact from a wireless radio of the hearing device.

5. The method of claim 4, wherein the wireless radio includes a Bluetooth® compatible radio.

6. The method of claim 1, comprising:
examining the recordings of segments of the telecoil signal;
identifying one or more recordings that contain primarily desired audio content; and
excluding the identified one or more recordings when isolating the interference component.

7. The method of claim 6, wherein identifying the one or more recordings that contain primarily desired audio content includes comparing the recordings to an energy level threshold.

8. The method of claim 1, wherein the trigger signal is configured to identify timing of an impending interference component.

9. The method of claim 1, wherein the trigger signal is configured to identify a type of an impending interference component.

10. The method of claim 1, wherein the hearing device includes a hearing aid.

11. A hearing device, comprising:
a magnetic sensor configured to receive an inductive input; and
at least one processor and data storage in communication with the at least one processor, wherein the data storage comprises instructions thereon that, when executed by the at least one processor, causes the at least one processor to:
receive a signal from the magnetic sensor;
use a trigger signal to initiate recordings of segments of the signal;

isolate an interference component from the signal using the recorded segments;

invert the interference component;

sum the inverted interference component with the signal to cancel the interference component from the signal; and play audio from the signal for a wearer of the hearing device.

12. The device of claim 11, wherein, to isolate an interference component, the at least one processor is programmed to:

add the recorded segments to a running average of recorded segments.

13. The device of claim 11, wherein, to sum the inverted interference component with the segments, the at least one processor is programmed to:

use time alignment based on the trigger signal.

14. The device of claim 11, wherein the interference component includes an artifact from a wireless radio of the hearing device.

15. The device of claim 11, wherein the magnetic sensor includes a telecoil.

16. The device of claim 11, wherein the at least one processor is programmed to:

examine the recordings of segments of the signal;

identify one or more recordings that contain primarily desired audio content; and exclude the identified one or more recordings when isolating the interference component.

17. The device of claim 16, wherein, to identify the one or more recordings that contain primarily desired audio content, the at least one processor is programmed to:

compare the recordings to an energy level threshold.

18. The device of claim 11, wherein the trigger signal is configured to identify timing of an impending interference component.

19. The device of claim 11, wherein the trigger signal is configured to identify a type of an impending interference component.

20. The device of claim 11, wherein the hearing device includes a hearing aid.

* * * * *